US012222026B2

(12) United States Patent
Verhoog

(10) Patent No.: US 12,222,026 B2
(45) Date of Patent: Feb. 11, 2025

(54) ELECTROMAGNETIC ACTUATING DEVICE AND TRANSMISSION SYSTEM PROVIDED WITH SAID ELECTROMAGNETIC ACTUATING DEVICE

(71) Applicant: VALEO EMBRAYAGES, Amiens (FR)

(72) Inventor: Roël Verhoog, Amiens (FR)

(73) Assignee: VALEO EMBRAYAGES, Amiens (FR)

( * ) Notice: Subject to any disclaimer, the term of this patent is extended or adjusted under 35 U.S.C. 154(b) by 0 days.

(21) Appl. No.: 18/566,812

(22) PCT Filed: Jun. 16, 2022

(86) PCT No.: PCT/EP2022/066513
§ 371 (c)(1),
(2) Date: Dec. 4, 2023

(87) PCT Pub. No.: WO2022/263608
PCT Pub. Date: Dec. 22, 2022

(65) Prior Publication Data
US 2024/0271686 A1    Aug. 15, 2024

(30) Foreign Application Priority Data
Jun. 17, 2021 (FR) .................................. FR2106420

(51) Int. Cl.
*F16H 48/34* (2012.01)
*F16H 48/42* (2012.01)
*H02K 7/00* (2006.01)
*H02K 11/21* (2016.01)

(52) U.S. Cl.
CPC ............ *F16H 48/34* (2013.01); *F16H 48/42* (2013.01); *H02K 7/006* (2013.01); *H02K 11/21* (2016.01)

(58) Field of Classification Search
CPC .... F16H 48/34; F16H 48/42; F16H 2048/346; H02K 7/006; H02K 11/21
See application file for complete search history.

(56) References Cited

U.S. PATENT DOCUMENTS

| 5,157,966 A | 10/1992 | Lugosi et al. | |
| 2009/0156346 A1* | 6/2009 | Donofrio | F16H 48/08 475/234 |
| 2014/0004988 A1* | 1/2014 | Yamanaka | F16H 48/24 475/231 |
| 2019/0032762 A1* | 1/2019 | Yoshisaka | F16H 48/24 |
| 2019/0309804 A1* | 10/2019 | Shibata | B60K 17/02 |

FOREIGN PATENT DOCUMENTS

| WO | WO 2008/024333 A2 | 2/2008 |
| WO | WO 2011/081235 A1 | 7/2011 |

OTHER PUBLICATIONS

International Search Report mailed on Sep. 20, 2022 in PCT/EP2022/066513 filed on Jun. 16, 2022 (2 pages).

\* cited by examiner

*Primary Examiner* — Justin Holmes
(74) *Attorney, Agent, or Firm* — Oblon, McClelland, Maier & Neustadt, L.L.P.

(57) ABSTRACT

An electromagnetic actuating device for a torque transmission system includes a shell arranged around an axis X. The shell being fixed relative to the axis X and includes walls defining an annular cavity which houses a coil and at least partially a plunger which is able to move axially along the axis X to actuate a coupling device.

20 Claims, 6 Drawing Sheets

ELECTROMAGNETIC ACTUATING DEVICE AND TRANSMISSION SYSTEM PROVIDED WITH SAID ELECTROMAGNETIC ACTUATING DEVICE

TECHNICAL FIELD

The invention concerns an electromagnetic actuating device for a torque transmission system.

The invention concerns the field of torque transmission systems for vehicles, in particular for electric or hybrid vehicles.

In particular, the invention concerns a transmission system integrating a differential gear device enabling the transmission and distribution of torque originating from a motor to the two wheel drive shafts of an axle of a motor vehicle.

TECHNOLOGICAL BACKGROUND

Electromagnetic actuators are used to actuate claw-type coupling devices, in particular in transmission systems integrating a differential gear. These actuators may be controlled as a function of signals emitted by a sensor and representative of the position of the coupling device. In general, the sensors detect the position of a detection target which moves with the movable part of the coupling device. This target is driven in rotation by the coupling device when the latter is engaged. A rotating target is not satisfactory since it must have an annular form to be able to be permanently situated opposite the sensor, which makes the device heavier and more bulky. Because of its large size, the target may also be stressed by oil flows which can cause micro-displacements of the target, which are undesirable.

Document WO08024333 discloses an electromagnetic actuating device in which a plunger is axially displaced to engage or release a claw. A detection target is carried by the plunger in order to determine the position of the claw. This electromagnetic actuating device is characterized by the presence of a frame which houses the coil, the magnetic shell 60/62, and the plunger 26 of the actuator. A sensor arranged opposite the target is mounted on the frame. The shell has an annular opening which the plunger "closes" as it moves axially. The plunger is arranged partly radially outside the magnetic shell and thus transmits the magnetic flux produced around the coil. According to one embodiment, the target is carried by a lug which passes radially through a notch in the frame.

However, such an electromagnetic actuating device is not totally satisfactory. In particular, the electromagnetic actuating device requires a relatively large frame around the plunger, which increases the complexity of the solution, its cost and/or size.

SUMMARY

An idea on which the invention is based is to propose an actuating device which is simpler and/or more compact.

According to a first aspect, the invention provides an electromagnetic actuating device for a torque transmission system, the electromagnetic actuating device comprising a shell arranged around an axis X, the shell being fixed relative to the axis X and comprising walls defining an annular cavity which houses a coil and at least partially a plunger which is able to move axially along the axis X to actuate a coupling device.

Advantageously, the shell also comprises a recess and the actuating device comprises a detection lug fixed to the plunger and passing through this recess, wherein the detection lug is able to be detected by a sensor so as to generate a signal representative of the axial position of the plunger.

Thus the relative rotation of the plunger relative to the shell about the axis X may be prevented or limited by the cooperation of the detection lug and the recess. Since the detection lug does not rotate relative to the shell and the sensor, no circular target is required, which thus limits the size of the device. Also, the positioning of the plunger in the shell allows the structure of the actuating device to be simplified, in particular by the omission of an additional frame. Furthermore, by arranging the plunger inside the shell, the plunger is protected during the assembly phase and the actuator can be centred in the housing from the outside.

Such an electromagnetic actuating device may include one or more of the following features:

Viewed in a plane containing the axis X, the shell comprises a first side wall arranged around the axis X, a second side wall arranged around the axis X and axially spaced from the first side wall, a radially inner wall arranged around the axis X and connecting the first side wall to the second side wall, at least one radially outer wall arranged around the axis X and extending axially from the at least one of the first side wall and the second side wall, the plunger being arranged radially inside the radially outer wall and radially outside the radially inner wall.

The relative rotation of the plunger relative to the shell about the axis X is prevented or limited by the cooperation of the detection lug and the recess.

The actuating device is configured to generate a magnetic flux turning around the coil section in a plane containing the axis X, the magnetic flux running substantially along the walls of the shell.

When the coil is energized, the magnetic flux produced by the coil allows the plunger to move from the retracted position to the deployed position.

The shell is able to conduct the magnetic flux generated by the coil. In other words, it is a magnetic shell.

The shell is a magnetic armature.

In a plane containing the axis X, the shell and the plunger in the deployed position cause a circulation of the magnetic flux generated by the coil around the coil section.

The shell is made at least partly of a ferromagnetic material.

The shell is made completely of a ferromagnetic material.

The plunger is made at least partly of a ferromagnetic material.

The plunger is made completely of a ferromagnetic material.

The shell is a hollow body with an axis of revolution about the axis X.

The shell comprises an annular opening arranged around the axis X, the plunger being able to engage in at least a portion of this annular opening when the coil is supplied with current above a first predefined threshold (in particular, above a first threshold of predefined intensity).

The portion of the plunger able to engage in the annular opening is situated radially outside a radially inner edge of the coil.

According to at least one embodiment, the portion of the plunger able to engage in the annular opening is situated radially outside the coil. Thus in comparison with solutions of the prior art, in which the plungers penetrate into the annular opening of the shell in a zone situated radially inside the coil, the coil may have a smaller diameter, which reduces the cost of the solution.

The plunger moves axially to close the magnetic flux around the coil section, viewed in a plane containing the axis X, when the coil is supplied with current above the first predefined threshold.

The annular opening is arranged radially inside the radially outer wall.

The annular opening extends all around the axis X.

The annular opening has a circular form viewed in a plane perpendicular to the axis X.

The shell comprises two annular parts which, in a plane containing the axis X, each have an L-shaped cross-section.

The two annular parts of the shell together define the annular cavity, in other words the void in which the coil is housed.

The detection lug fits circumferentially in the recess of the shell. In other words, the recess is circumferentially delimited by two end edges, and the detection lug is fitted between these two edges.

The recess may have a contour which is closed or open on the outside.

In particular, the recess is a cavity communicating with the exterior of the shell.

The recess may have a slot shape.

The edge or edges axially delimiting the recess may serve as a stop for limiting the axial movement of the plunger.

The dimensions of the plunger and the detection lug firstly, and of the shell and its recess secondly, may ensure a sliding connection along the axis X between the plunger and the shell.

The plunger is arranged radially outside the coil. Thus the coil may be smaller and less costly.

The annular opening is arranged radially outside the coil.

According to one embodiment, the recess is situated on the radially outer wall.

In some cases, the detection lug may extend radially.

As a variant, the recess is situated on the one of the first and second side walls.

Preferably, the second side wall is situated, relative to the coil, on the side of the coupling device actuated by the axial movement of the plunger, and the first side wall is situated on the other side, the recess being situated at least partly in the first side wall.

In some cases, the detection lug may extend axially.

The plunger comprises a main body with a general shape of a hollow cylinder of revolution around the axis X.

The plunger, in particular its main body, is centred by its outer circumference on the shell, in particular on the inner circumference of the outer cylindrical wall.

The magnetic flux passes radially through the plunger.

The detection lug may be cylindrical in form, in particular in the form of a straight circular cylinder.

The detection lug has at its end a detection zone able to cooperate with the sensor to provide a signal representative of the axial position of the plunger.

This detection zone may be mounted on a plate. Detection is thus facilitated.

The detection zone may be formed on a separate piece.

The sensor may be a magnetic sensor.

In some cases, the detection zone may be formed in a magnetic sheet or a magnet.

Outside the detection zone, the lug may be made of a non-magnetic material. The term "non-magnetic" means a material which is not or is only slightly attracted or repelled by a magnet, for example copper and aluminum etc.

The electromagnetic actuating device may comprise a screen arranged between the magnetic sensor and the coil. The screen is configured to deflect the magnetic flux generated by the coil away from the sensor. Thus the measurement made by the magnetic sensor is weak and requires no correction linked to the value of the magnetic field generated by the coil.

The screen is made of a non-magnetic material.

The screen may be metallic.

The screen may be carried by the detection lug.

The electromagnetic actuating device comprises a connecting ring fixed to the plunger.

The connecting ring is non-magnetic, for example made of copper or bronze.

The connecting ring is fixed to the axial end of the plunger on the side of the coupling device actuated by the axial movement of the plunger. Thus the connecting ring is arranged in the axial continuation of the plunger in the direction of the coupling device.

The connecting ring and the plunger are rigidly connected together by one of their axial ends.

Preferably, the connecting ring is fixed to the plunger, in particular by gluing, laser welding, forced shrink fitting or by fixing studs.

According to one embodiment, the plunger is situated axially facing the coil. In other words, there is an axis parallel to the axis X passing through the plunger and the coil.

In particular, the plunger sits completely in the radial space occupied by the coil. In other words, all axes parallel to the axis X passing through the plunger pass through the coil. Thus this design is radially very compact.

A thrust spring may be arranged axially between the coil and the plunger to exert a thrust force on the plunger which is complementary to the magnetic force generated by the coil on the plunger.

The inner cylindrical wall is arranged around the axis X and connects a radially inner edge of the first side wall to a radially inner edge of the second side wall.

The outer cylindrical wall is arranged around the axis X and extends radially from at least one of the radially outer edge of the first side wall and the radially outer edge of the second side wall.

Each annular part of the shell having an L-shaped cross-section comprises one of the first and the second side walls, and one of the radially inner wall and the radially outer wall.

The invention also concerns a transmission system for a motor vehicle comprising:

an electromagnetic actuating device as described above, a first element and a second element, the second element being able to rotate relative to the first element around the axis X, the at least one of the first element and the second element being able to transmit a torque between a motor and a vehicle wheel, a coupling device which is actuatable by the electromagnetic actuating device; the coupling device comprising a first coupling part able to be axially pressed, directly or indirectly, by the plunger of the electromagnetic actuating device, and a second coupling part; the first coupling part being fixed in rotation about the axis X relative to the first element, and the second coupling part being fixed in rotation about the axis X relative to the second element; the first coupling part being axially movable between a coupled position in which the first coupling part is coupled to the second coupling part so as to prevent a relative rotation of the first element and second element about the axis X, and a decoupled position in which the first coupling part and the second coupling part are decoupled so as to allow a relative rotation of the first element and second element about the axis X, a sensor cooperating with the detection lug to supply a signal representative of the axial position of the plunger, so as to determine whether the first coupling part is in the decoupled position, the coupled position, or an intermediate position between the decoupled position and the coupled position.

Such a transmission system may include one or more of the following features:

The position of the first coupling part may thus be determined by a control unit as a function of the signal supplied by the sensor.

The first coupling part cannot rotate relative to the first element relative to the axis X.

The coupled position blocks the relative rotation between the first element and the second element.

Preferably, the first coupling part is axially fixed to the plunger. Thus the measurement of the plunger's position by the sensor allows precise determination of the position of the first coupling part.

Advantageously, the first coupling part is connected to the plunger by means of the connecting ring.

A pivot joint kinematically links the plunger and the first coupling part so as to allow a relative rotation of the plunger and the first coupling part about the axis X. Preferably, the pivot about the axis X takes place between the connecting ring and the first coupling part.

In order to fix them axially together, the connecting ring and the first coupling part each comprise a groove, the two grooves being arranged radially opposite one another, and a retaining ring is arranged inside the two grooves.

The ring may thus be mounted by clipping or click fastening.

The ring thus ensures an axial support of the first coupling part relative to the ring and the plunger, which allows a good assessment of the position of the first coupling part while allowing a relative rotation between the plunger and the first coupling part about the axis X.

The transmission system comprises return springs arranged between a support element of the transmission system which is axially fixed, and the one of the plunger, the connecting ring and the first coupling part, wherein the return springs are able to bring the first coupling part back into the decoupled position when the coil is not supplied with current, or when the current is below a second predefined threshold.

The first element and the second element are arranged in the torque transmission path, and the coupling device allows interruption or enabling of the torque transmission between the first element and the second element.

The transmission system comprises a differential drive device, the first element comprising a casing inside which the second coupling part is housed; the first coupling part comprising an inner portion which is housed inside the casing, an outer portion which is positioned outside the casing, and a plurality of connecting portions which axially connect the inner portion and the outer portion of the first coupling part, each of the connecting portions passing through a corresponding through-opening made in the casing.

The return springs rest against the casing.

The force exerted by the return springs is greater than the force exerted by said at least one thrust spring.

The second element comprises a supporting ring which is guided in rotation about the axis X inside the casing, two planet pinions which are mounted to rotate on the supporting ring about an axis Z perpendicular to the axis X, and two sun gears which are movable in rotation about the axis X and each in mesh with the two planet pinions and each intended to be rotationally fixed to a wheel drive shaft; the second coupling part of the coupling device being rotationally fixed to the supporting ring about axis X. A wheel drive shaft is a shaft which drives the wheel in rotation upstream of the universal joint where a universal joint is present.

The first coupling part and the second coupling part each comprise at least one coupling relief which are complementary to one another.

The second coupling part may be formed directly on the supporting ring.

For example, the first coupling part and the supporting ring each comprise at least one coupling tooth which are complementary to one another.

The coupling device may be a claw-type device, the one of the first and second coupling parts comprising teeth while the other comprises corresponding slots into which said teeth engage when the first coupling part is in the coupled position.

Preferably, the transmission system is accommodated in a housing.

This housing may comprise a non-magnetic wall, for example of aluminum, and the sensor is mounted on the housing wall outside the housing, the sensor being able to detect the detection zone of the detection lug through the housing wall.

In some cases, the detection zone is preferably formed by a magnet.

Preferably, stops, in particular in the form of studs, are carried by the shell and rest against the outer ring of an e.g. tapered roller bearing interposed between the one of the wheel drive shafts and the housing (not shown). For example, three studs are arranged 120 degrees apart.

The electromagnetic actuating device is mounted around a lateral sleeve of the casing which surrounds one of the wheel drive shafts.

The shell has an inner contour fitted around the lateral sleeve, allowing the rotation of the lateral sleeve and hence of the casing about the axis X relative to the shell of the electromagnetic actuating device.

The end of the lateral sleeve is encased inside the inner ring of the bearing.

The shell may be blocked in rotation relative to axis X by a retaining device arranged between the shell and the housing. This retaining device may be realized by a stud cooperating in a recess or slot in the reduction gear housing.

The transmission system also comprises a reduction gear able to drive the first element.

The differential drive device is driven in rotation by the reduction gear.

The reduction gear is also arranged in the housing.

The invention also concerns a power train, in particular electrified, comprising a motor, in particular electric, at least one drive wheel, and a transmission system as described above, the transmission system being configured to transmit a torque between the motor and said at least one drive wheel.

Preferably, the machine is intended to generate electricity.

The invention also relates to a vehicle, in particular a motor vehicle, comprising such a power train.

BRIEF DESCRIPTION OF THE FIGURES

The invention will be better understood, and other aims, details, features and advantages thereof will become clearer, from the following description of several particular embodiments of the invention, provided solely by way of non-limiting illustration, with reference to the attached drawings.

DESCRIPTION OF THE EMBODIMENTS

In the description and the claims, the terms "external" and "internal". and the orientations "axial" and "radial" will be used to denote elements of the electromagnetic actuating device and of the transmission system according to the definitions given in the description. By convention, the "axial" orientation is directed along the axis X, and the "radial" orientation is directed perpendicularly to the axis X. The axis X is the reference axis of the electromagnetic actuating device. The terms "inner" and "outer" should be considered relative to the axis X. An "inner" element is relatively closer to the axis X than an "outer" element. The "circumferential" orientation is directed orthogonally to the axis X and perpendicularly to the radial direction.

Figure 1:
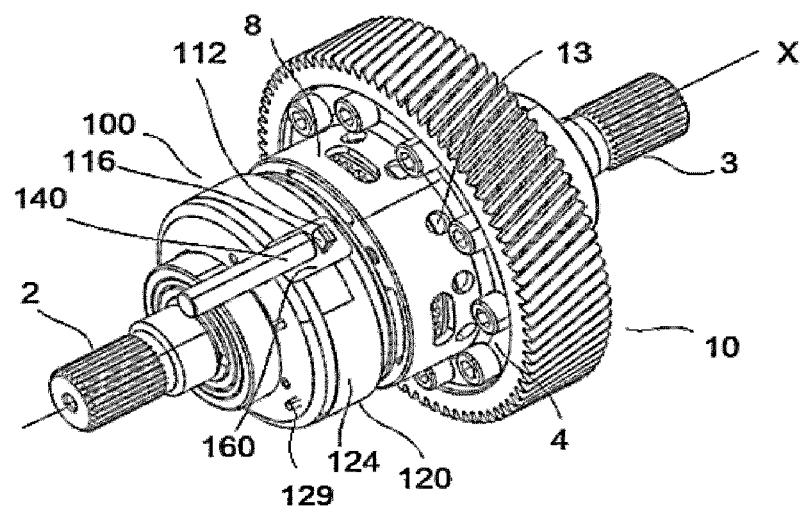
FIG. 1 is a general, perspective view of a transmission system containing a differential drive device and equipped with an electromagnetic actuating device according to a first embodiment.
Figure 2:
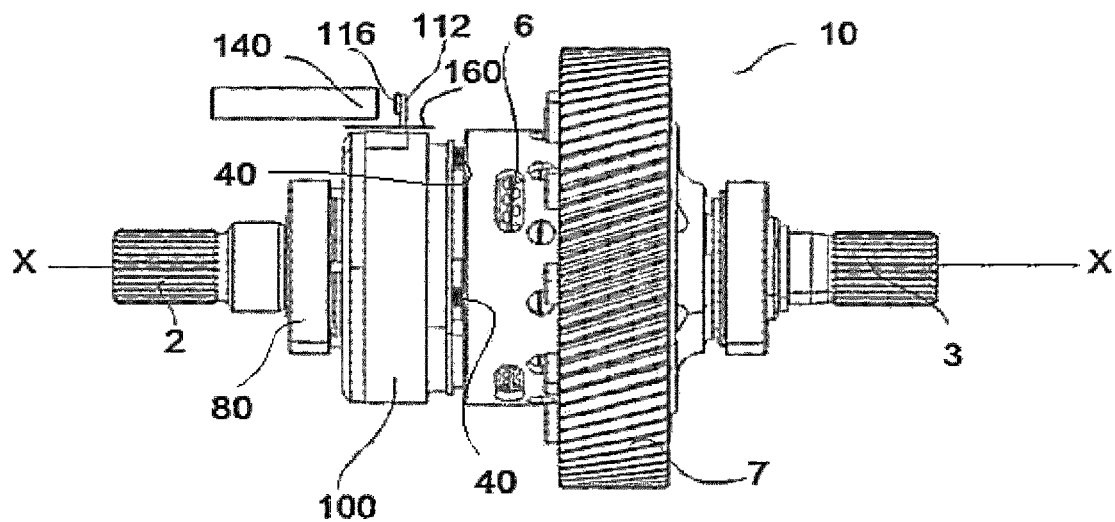
FIG. 2 is a side view of the transmission system from FIG. 1.
Figure 4:
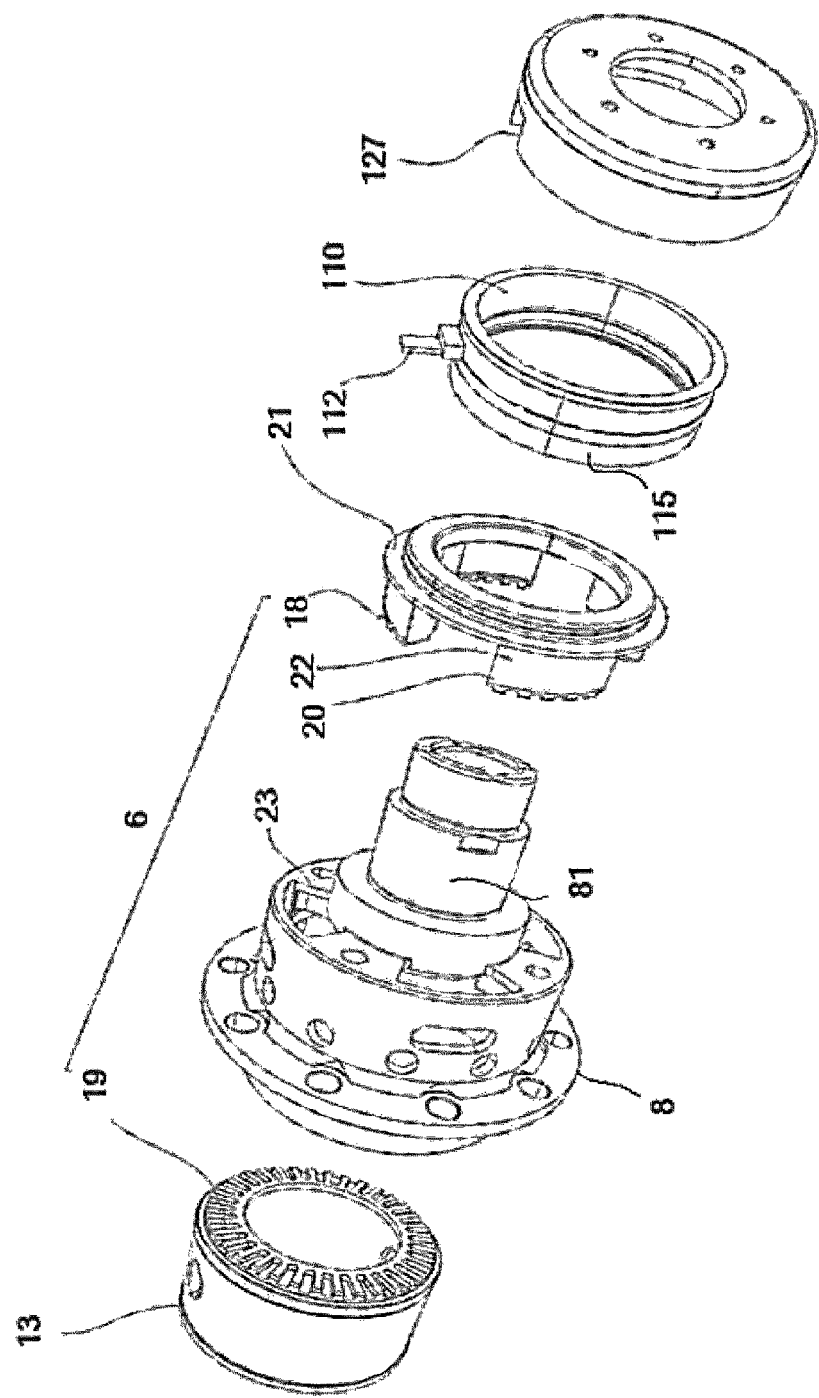
FIG. 4 is an exploded, partial, perspective view of the electromagnetic actuating device from FIGS. 1 to 3, wherein only some elements of the electromagnetic actuating device are shown.

FIGS. 1 and 4 illustrate a transmission system 1 comprising an electromagnetic actuating device according to a first embodiment. The transmission system 10 here comprises a differential drive device which is used in a vehicle power train to transmit and distribute a torque originating from a motor (not shown) towards two wheel drive shafts 2, 3 of a vehicle axle. Such a transmission system may for example form part of a secondary transmission chain able to transmit a torque from a secondary motor of the vehicle, such as an electric motor, towards a rear or front axle of the vehicle, while a primary transmission chain is able to transmit a torque from another motor, for example an inner combustion engine, towards the wheel drive shafts of another axle of the vehicle.

The transmission system comprises a first element 4 which is rotationally mobile about the axis X and intended to be coupled, in particular via a reduction gear, to a motor such as an electric motor (not shown); a second element 5 which is likewise rotationally mobile about the axis X and intended to drive the wheel drive shafts 2, 3 in rotation around the axis X; and a coupling device 6 able selectively to couple or decouple the first element 4 and the second element 5. The first element 4 comprises a toothed wheel 7 which is intended to be coupled to the motor via a reduction gear train (not shown), and a casing 8 which is rotationally fixed to the toothed wheel 7. The casing 8 comprises two parts 9a, 9b which are fixed together. For this, in the embodiment shown, each of the two parts 9a, 9b comprises an external flange via which the two parts 9a, 9b are connected to the toothed wheel 7 and to one another.

The second element 5 comprises a supporting ring 13 of annular shape, which is guided in rotation about the axis X inside the casing 8. For this purpose, the casing 8 has an inner cylindrical portion collaborating with a cylindrical outer surface of the supporting ring 13 in order to guide this in rotation relative to the casing 8. The second element 5 also comprises two planet pinions 14, 15 (shown in FIG. 1) which are mounted to rotate on the supporting ring about an axis Z perpendicular to the axis X. The two planet pinions 14, 15 each have bevel gear teeth which mesh with complementary bevel gear teeth of the two sun gears 16, 17. The two sun gears 16, 17 are rotationally mobile about the axis X and are each rotationally fixed to one of the two wheel drive shafts 2, 3. The supporting ring 13, the planet pinions 14, 15 and the sun gears 16, 17 thus form a differential drive device allowing the two wheel drive shafts 2, 3 to rotate at different speeds.

Also, the transmission system 10 comprises a coupling device 6 which, in the coupled position, allows a torque to be transmitted between the first element 4 and the supporting ring 13. Thus, when the coupling device 6 is in the coupled position, the transmission system allows torque to be transmitted between the motor and the wheel drive shafts 2, 3, while performing a differential function to allow the wheel drive shafts 2, 3 to rotate at different speeds. When the coupling device 6 is in the decoupled position, the transmission of torque from the motor to the wheel drive shafts 2, 3 is interrupted between the first element 4 and the support ring 13.

In another embodiment (not shown), the coupling device is configured to couple the first element 4 to one of the two sun gears 16, 17. In such an embodiment, the supporting ring 13 is rotationally fixed to the casing, or the two planet pinions 14, 15 are mounted to rotate about an axis Z, perpendicular to the axis X, directly on the casing 8. Such a coupling device is therefore aimed at preventing the two wheel drive shafts 2, 3 from rotating at different speeds (differential locking).

Returning to the embodiment shown, it is noted that the coupling device 6 comprises a first coupling part 18 which is rotationally fixed to the casing 8 while being movable axially along the axis X relative to said casing 8. The first coupling part 18 is movable between a decoupled position and a coupled position. In the decoupled position, the first coupling part 18 is decoupled from a second coupling part 19 which is rotationally fixed to the supporting ring 13, so that the transmission of torque is interrupted between the casing 8 and the supporting ring 13. By contrast, in the coupled position, the first coupling part 18 is coupled to the second coupling part 19 to allow the transmission of torque between the casing 8 and the supporting ring 13.

In the embodiment depicted, the coupling device 6 is a claw-type device. Thus one of the first and second coupling parts 18, 19 comprises teeth while the other comprises corresponding slots into which said teeth engage when the first coupling part 18 is in the coupled position. In the embodiment depicted, the second coupling part 19 is formed of one piece with the supporting ring 13. In other words, the teeth or slots are formed in the lateral face of the supporting ring 13 which faces towards the first coupling part 18. However, although the invention has been described in connection with a claw-type coupling device, it is not restricted thereto, and the coupling device could be of another type and notably a friction coupling device.

As can be seen from FIG. 4, the first coupling part 18 comprises an inner portion 20 which is housed inside the casing 8, an outer portion 21 which is positioned outside the casing 8, and connecting portions 22 which are regularly distributed around the axis X and each pass through a corresponding through-opening 23 provided in the casing 8, which allows the first coupling part 18 to be rotationally fixed to the casing 8 while allowing a relative axial movement between the first coupling part 18 and the casing 8. In the embodiment shown, the outer portion 21 is annular whereas the inner portion 20 comprises lugs extending axially in the continuation of the connecting portions 22. However, according to another variant embodiment, the structure is reversed and the outer portion 20 is annular whereas the inner portion 21 comprises a plurality of axially oriented tabs extending in the continuation of the connecting portions 22.

Also, the coupling device 6 comprises an electromagnetic actuating device 100 allowing axial movement of the first coupling part 18. This actuating device is shown schematically in cross-section in FIG. 5.

The electromagnetic actuating device 100 comprises a magnetic shell 120 arranged around an axis X. The shell 120 is axially and circumferentially fixed relative to the axis X and comprises walls defining an annular cavity 150 which houses a coil 130 and at least partially a plunger 110 which is able to move axially along the axis X.

Stops 129, in particular in the form of studs, are carried by the shell 120 and rest against the outer ring of an e.g. tapered roller bearing 80 interposed between the wheel drive shaft 2 and the housing of the transmission system (not shown). For example, three studs are arranged 120 degrees apart. The shell 120 may be blocked in rotation relative to axis X by a retaining device arranged between the shell 120 and said housing. Said retaining device may be realized by a stud cooperating in a recess or slot in the housing.

The transmission system housing may also contain a reduction gear configured to drive in rotation the toothed wheel 7 and the differential drive device via the casing 8.

Figure 3:
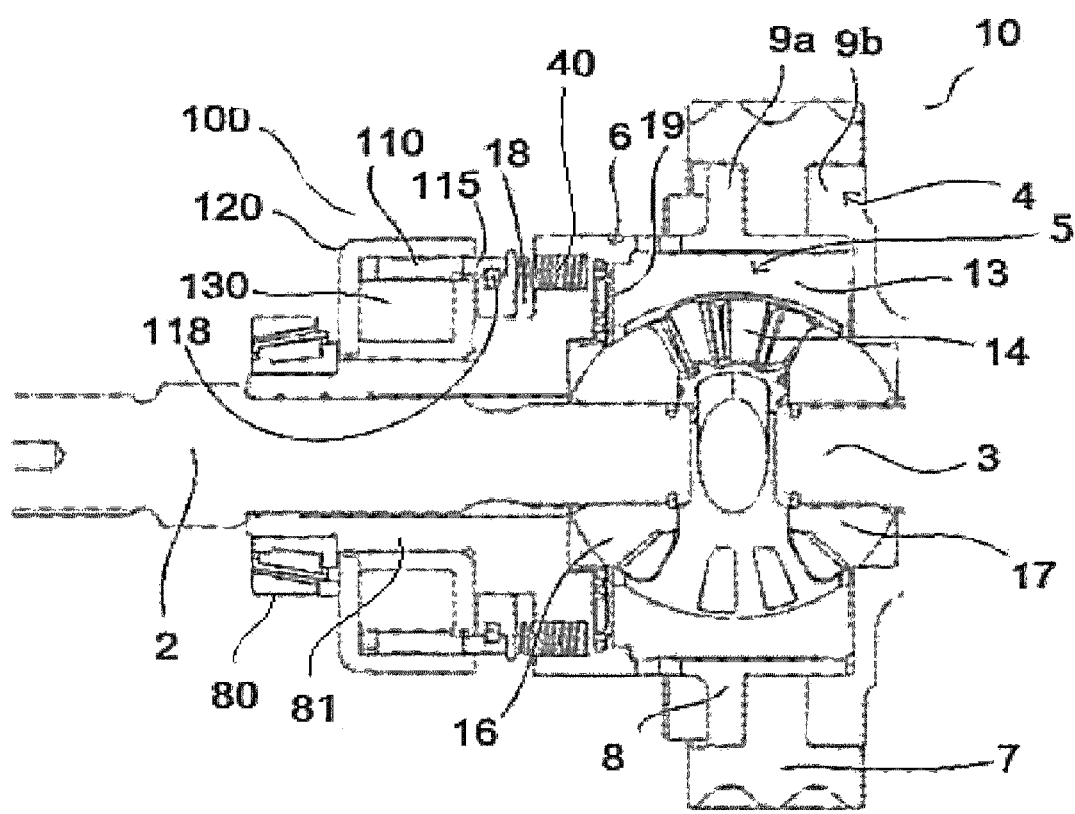
FIG. 3 is a sectional view of FIG. 2 passing through the axis X.

With regard to FIG. 3, we see that the electromagnetic actuating device 100 is mounted around a lateral sleeve 81 of the casing 8. This lateral sleeve 81 surrounds the wheel drive shaft 2. The shell has an inner contour fitted around the lateral sleeve 81 and allowing the rotation of the lateral sleeve 81 and hence of the casing 8 about the axis X relative to the shell 120 of the electromagnetic actuating device 100.

The shell 120 is a hollow body with an axis of revolution about the axis X.

The shell 120 comprises, in a plane passing through the axis X:
- a first side wall 121,
- a second side wall 122 axially spaced from the first side wall 121,
- a radially inner wall 123 arranged around the axis X and connecting a radially inner edge of the first side wall 121 to a radially inner edge of the second side wall 122,
- at least one radially outer wall 124 arranged around the axis X and extending axially from the radially outer edge of the first side wall 121.

More precisely, the second side wall 122 is situated, relative to the coil 130, on the side of the coupling device 6 controlled by the electromagnetic actuating device 10, and the first side wall 121 is situated on the other side.

Figure 5:
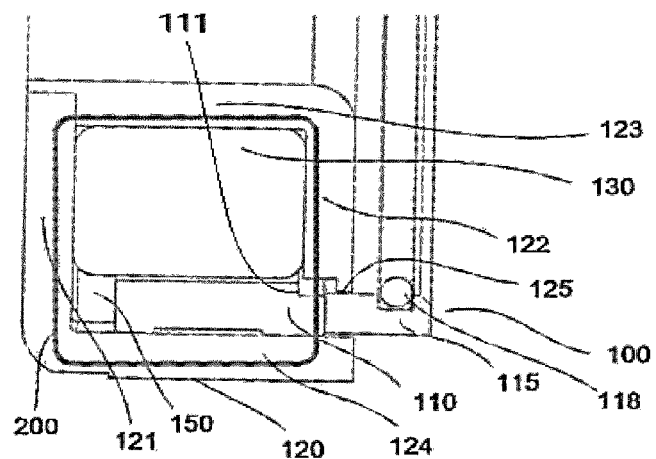
FIG. 5 is a partial, schematic, sectional view of the electromagnetic actuating device from FIGS. 1 to 4.

When the coil is supplied with current above a predefined threshold, the actuating device generates a magnetic flux 200. This flux 200 turns around the section of coil 130 in a plane containing the axis X, as shown in FIG. 5, wherein the magnetic flux runs substantially along the walls of the shell 120 and passes radially through the plunger 110.

To enable this, the shell 120 is made at least partly of a magnetic material.

The shell 120 comprises an annular opening 125 arranged all around the axis X and arranged radially inside the radially outer wall 124. The annular opening has a circular form viewed in a plane perpendicular to the axis X.

The shell 120 comprises two annular parts which, in a plane containing the axis X, are each L-shaped in cross-section. The two annular parts of the shell 120 jointly define the cavity 150, in other words the void, in which the coil 130 is housed. Each annular part of the shell having an L-shaped cross-section comprises one of the first and the second side walls 121, 122, and one of the radially inner wall 123 and the radially outer wall 124.

The plunger 110 is able to engage in at least a portion of the annular opening 125 when the coil 130 is supplied with current above a first predefined threshold. The plunger then moves axially to close the magnetic flux 200 around the coil section, viewed in a plane containing the axis X. To do this, the plunger 110 has a main body of annular form, of ferromagnetic material such as iron or steel for example.

Also, the plunger 110 comprises a shoulder 111 intended to come to stop against the shell 120 to limit the axial movement of the plunger 110.

The plunger 110 is arranged radially inside the radially outer wall 124 and radially outside the radially inner wall 123. In this embodiment, the plunger 110 is arranged radially outside the coil 130.

The main body of the plunger has a general shape of a hollow cylinder of revolution around the axis X.

The plunger is preferably centred by its outer circumference on the shell 120, in particular on the inner circumference of the outer wall 124 of the shell 120.

The movement of the plunger allows the axial translation of the first coupling part 18 of the electromagnetic actuating device.

When the coil 130 is energized, the magnetic flux allows the plunger 110 to move from the retracted position to the deployed position. When the plunger 110 is in the deployed position, the shell 120 exerts an attraction on the plunger 110, enabling it to be held in the deployed position while reducing the voltage.

The electromagnetic actuating device is also equipped with a detection zone 116, also called a target, which is axially fixed relative to the plunger 110.

The shell 120 comprises a recess 127, and the actuating device comprises a detection lug 112 fixed to the plunger 110 and passing through this recess 127, the detection lug 112 carrying the target 116 which can be detected by the sensor 140.

Also, the transmission system comprises a preferably contactless sensor 140, shown on FIG. 1, which is here positioned axially facing the target 116 and configured to provide a signal representative of the axial distance between the target 116 and the sensor 140. Thus the sensor 140 is able to provide a signal representative of the axial position of the plunger 110, which allows determination of the state of the coupling device 6, namely open or closed, or in an intermediate position. The sensor 140 is here a magnetic sensor, for example a Hall effect sensor, but other types of sensor, in particular contactless, may be used.

Advantageously, the electromagnetic actuating device 10 comprises a screen 160 arranged between the magnetic sensor 140 and the coil 130. This screen is configured to deflect the magnetic flux 200 generated by the coil 130 away from the sensor 140. This screen may be metallic. It is here mounted on a detection lug 112.

The detection lug 112 may be cylindrical in form, in particular in the form of a straight circular cylinder.

The detection lug has a detection zone 116 (target) which is able to cooperate with the sensor 140 to provide a signal representative of the axial position of the plunger 110. This detection zone 116 may take the form of a plate. It is preferably situated on the end zone of the detection lug 112. Preferably, the target is formed on a separate piece or directly on the detection lug 112. The detection zone is be formed in a magnetic sheet or a magnet. Outside the detection zone, the detection lug 112 may be made of a non-magnetic material.

FIG. 4 shows that the relative rotation of the plunger 110 relative to the shell about the axis X is prevented or limited by the cooperation of the detection lug 112 and the recess 127. Since the target does not rotate relative to the sensor, no circular target is required, which thus limits the size of the device. The detection lug 112 fits circumferentially in the recess 127 of the shell 120. In other words, the recess 127 is circumferentially delimited by two end edges, and the detection lug 112 is fitted between the two edges.

The recess 127 is a cavity communicating with the exterior of the shell, i.e. it is open, in other words, a notch or cut-out. The recess may also have a slot shape.

If desired, the edge or edges axially delimiting the recess 127 may serve as a stop for limiting the axial movement of the plunger.

The dimensions of the plunger 110 and the detection lug 112 firstly, and of the shell 120 and its recess secondly, ensure a sliding connection along the axis X between the plunger and the shell.

Figure 6:
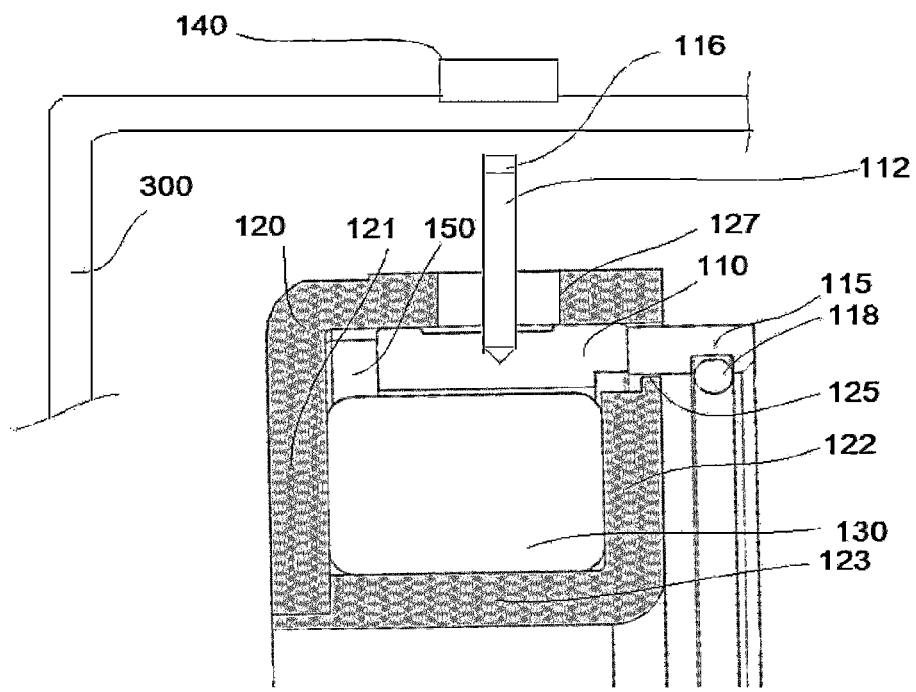
FIG. 6 is a partial, schematic, cross-sectional view of an electromagnetic actuating device according to a second embodiment.
Figure 8:
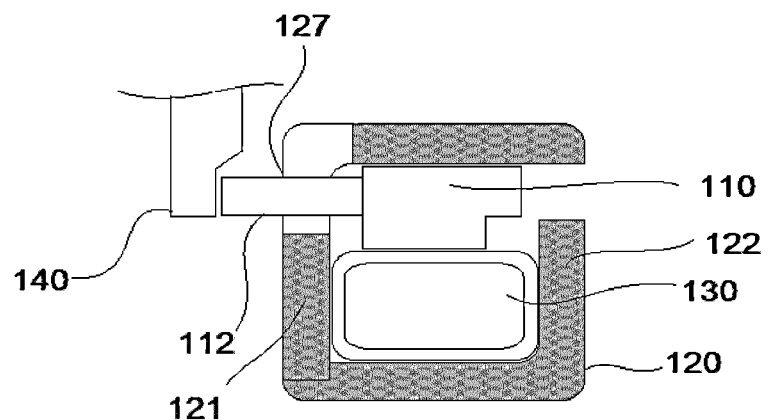
FIG. 8 is a partial, schematic, cross-sectional view of an electromagnetic actuating device according to a fourth embodiment.

In the first, second and fourth embodiments shown on FIGS. 5, 6 and 8, the plunger 110 is arranged radially outside the coil 130. Thus the coil may be radially more compact and hence less costly. The annular opening 125 is also arranged radially outside the coil 130.

Figure 7:
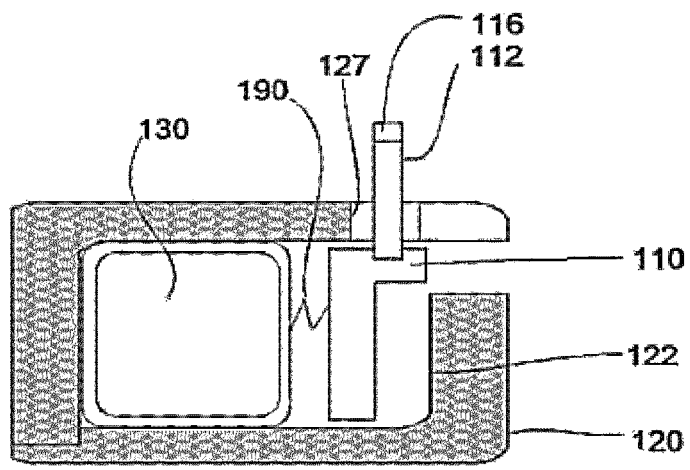
FIG. 7 is a partial, schematic, cross-sectional view of an electromagnetic actuating device according to a third embodiment.

However, in the third embodiment shown on FIG. 7, the plunger 110 is situated axially facing the coil 130. This arrangement is radially compact. At least one thrust spring 190 is arranged axially between the coil 130 and the plunger to exert a thrust force on the plunger 110 which is complementary to the magnetic force generated by the coil 130 on the plunger 110.

In the first, second and third embodiments shown on FIGS. 5, 6 and 7, the recess is situated on the radially outer wall 124 and the detection lug 112 extends radially.

As a variant, in the fourth embodiment shown on FIG. 8, the recess 127 is situated at least partially in the first side wall 121. The detection lug then extends preferably axially towards the rear to pass through the first side wall 121. The sensor 140 is then also placed at the rear of the electromagnetic actuating device. This arrangement is radially very compact.

Preferably, the first coupling part is axially fixed to the plunger. Thus the measurement of the plunger's position by the sensor allows precise determination of the position of the first coupling part 18.

As FIGS. 3 to 5 show, the electromagnetic actuating device 10 comprises a connecting ring 115 fixed to the plunger 110. The connecting ring 115 and the plunger 110 are preferably rigidly connected together by one of their axial ends. For example, the connecting ring is fixed to the plunger by laser welding.

For example, the connecting ring 115 is non-magnetic, for example made of copper, to limit undesirable leakage of the magnetic field towards the exterior of the shell, in particular towards the first coupling part.

The first coupling part 18 is connected to the plunger 110 by means of the connecting ring 115. The actuating force is transmitted by the plunger to the first coupling part 18 via the connecting ring 115.

A pivot link kinematically links the connecting ring 115 and the annular part of the first coupling part 18 to allow a relative rotation of the plunger 110 and the first coupling part 18 about the axis X.

In order to axially retain the connecting ring 115 and the first coupling part 18, the connecting ring 115 and the first coupling part 18 each comprise a groove, the two grooves being arranged radially opposite one another, and a retaining ring 118 is arranged inside the two grooves. The ring 118 may thus be mounted by clipping or click fastening. The ring 118 thus ensures an axial support of the first coupling part 18 relative to the connecting ring 115 and the plunger 110, which allows a good assessment of the position of the first coupling part 18 while allowing a relative rotation between the plunger 110 and the first coupling part 18 about the axis X.

According to another embodiment (not shown), one of the grooves is formed directly on the plunger 110, and the electromagnetic actuating device then has no connecting ring.

The transmission system also comprises return springs 40 arranged between a support element of the casing 8 and the first coupling part 18, wherein the return springs are able to bring the first coupling part 18 back into the decoupled position when the coil 130 is not supplied with current, or when the current of the coil is below a second predefined threshold.

When the electromagnetic actuating device is equipped with one or more thrust springs, the force exerted by the return springs 40 is greater than the force exerted by said at least one thrust spring.

Such a transmission system is generally housed in a fixed housing, for example made of aluminum.

The second embodiment shown on FIG. 6 is distinguished from the other embodiments in that the sensor 140 is mounted on a wall of the housing 300, outside the housing. The sensor 140 is configured to detect the target 116 carried by the detection lug 112 through the wall of the housing 300 which is non-magnetic, for example made of aluminum.

In some cases, the target 116 is preferably formed by a magnet.

Figure 9:
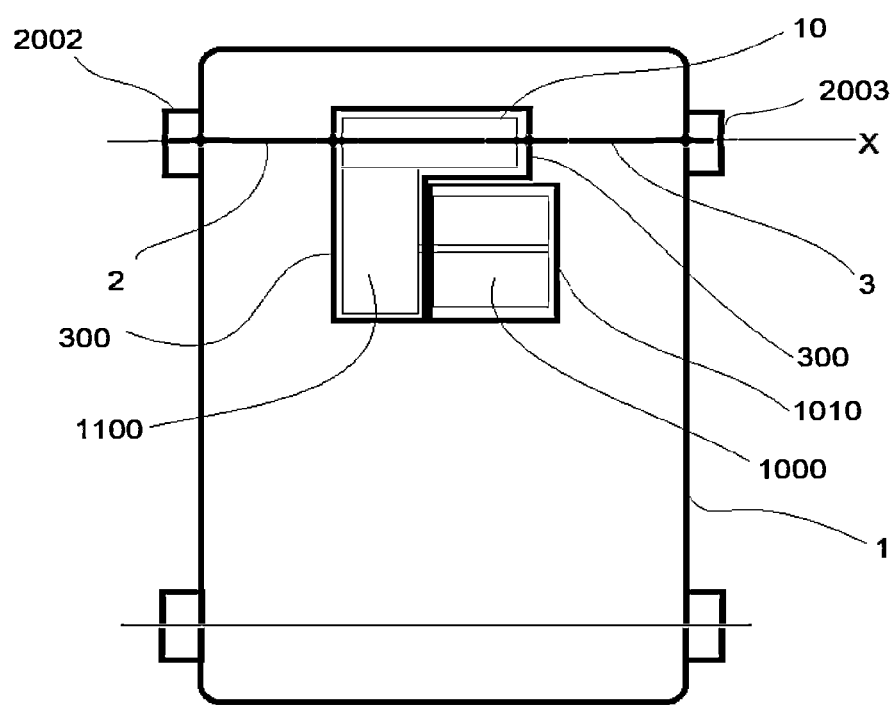
FIG. 9 is a schematic view of a vehicle comprising an electric power train equipped with the transmission system from FIGS. 1 to 3.

FIG. 9 shows highly schematically a vehicle 1 comprising an electric power train driving two wheels 2002 and 2003. This electric power train comprises an electric machine 1000, a reduction gear 1100 and a transmission system 10 as described above. The reduction gear 1100 and the transmission system 10 are arranged in a common housing 300. The housing 1100 of the electric machine and the housing 300 may be joined to one another.

Although the invention has been described in connection with a plurality of particular embodiments, it is obvious that it is in no way limited thereto and that it comprises all technical equivalents of the means described and combinations thereof where these fall within the scope of the invention as defined in the claims.

The transmission system here comprises a differential gear, but the electromagnetic actuating device may be used with other types of transmission system.

In the claims, any reference sign between parentheses should not be interpreted as limiting the claim.

The invention claimed is:

1. An electromagnetic actuating device for a torque transmission system, the electromagnetic actuating device comprising:
a shell arranged around an axis X, the shell being fixed relative to the axis X and comprising walls defining an annular cavity which houses a coil and at least partially a plunger which is able to move axially along the axis X to actuate a coupling device, the actuating device being characterized in that the shell also comprises a recess and the actuating device comprises a detection lug fixed to the plunger and passing through this recess, wherein the detection lug is able to be detected by a sensor so as to generate a signal representative of the axial position of the plunger, wherein the plunger is centred by its outer circumference on the shell.

2. The electromagnetic actuating device as claimed in claim 1, wherein the plunger is arranged radially outside the coil.

3. The electromagnetic actuating device as claimed in claim 1, wherein the plunger is situated axially facing the coil.

4. The electromagnetic actuating device as claimed in claim 1, wherein the shell comprises, viewed in a plane containing the axis X:
a first side wall arranged around the axis X,
a second side wall arranged around the axis X and axially spaced from the first side wall,
a radially inner wall arranged around the axis X and connecting the first side wall to the second side wall,
at least one radially outer wall arranged around the axis X and extending axially from the at least one of the first side wall and the second side wall, the plunger being arranged radially inside the radially outer wall and radially outside the radially inner wall.

5. The electromagnetic actuating device as claimed in claim 4, wherein the recess is situated on the radially outer wall.

6. The electromagnetic actuating device as claimed in claim 4, wherein the second side wall is situated, relative to the coil, on the side of the coupling device actuated by the axial movement of the plunger, and the first side wall is situated on the other side, the recess being situated at least partly in the first side wall.

7. The electromagnetic actuating device as claimed in claim 1, wherein the detection lug is able to be detected by a magnetic sensor, and the electromagnetic actuating device comprises a screen arranged between the sensor and the coil, the screen being carried by the detection lug.

8. The electromagnetic actuating device as claimed in claim 1, wherein the electromagnetic actuating device comprises a non-magnetic connecting ring fixed to the axial end of the plunger, on the side of the coupling device actuated by the axial movement of the plunger.

9. A transmission system for a motor vehicle, comprising:
the electromagnetic actuating device according to claim 1,
a first element and a second element, the second element being able to rotate relative to the first element around the axis X, the at least one of the first element and the second element being able to transmit a torque between a motor and a vehicle wheel,
a coupling device which is actuatable by the electromagnetic actuating device; the coupling device comprising a first coupling part able to be axially pressed by the plunger of the electromagnetic actuating device, and a second coupling part; the first coupling part being fixed in rotation about the axis X relative to the first element, and the second coupling part being fixed in rotation about the axis X relative to the second element; the first coupling part being axially movable between a coupled position in which the first coupling part is coupled to the second coupling part so as to prevent a relative rotation of the first element and second element about the axis X, and a decoupled position in which the first coupling part and the second coupling part are decoupled so as to allow a relative rotation of the first element and second element about the axis X,
a sensor cooperating with the detection lug to supply a signal representative of the axial position of the plunger, so as to determine whether the first coupling part is in the decoupled position, the coupled position, or an intermediate position between the decoupled position and the coupled position, wherein the transmission system comprises a differential drive device, and the first element comprises a casing inside which the second coupling part is housed; the first coupling part comprising an inner portion which is housed inside the casing, an outer portion which is positioned outside the casing, and a plurality of connecting portions which axially connect the inner portion and the outer portion of the first coupling part, each of the connecting portions passing through a corresponding through-opening made in the casing.

10. The transmission system as claimed in claim 9, wherein the second element comprises a supporting ring which is guided in rotation about the axis X inside the casing, two planet pinions which are mounted to rotate on the supporting ring about an axis Z perpendicular to the axis X, and two sun gears which are movable in rotation about the axis X and each in mesh with the two planet pinions and each intended to be rotationally fixed to a wheel drive shaft; the second coupling part of the coupling device being rotationally fixed to the supporting ring about the axis X.

11. The transmission system as claimed in claim 9, wherein the transmission system is housed in a housing comprising a non-magnetic wall, for example of aluminum, and the sensor is mounted on the housing wall outside the housing, the sensor being able to detect the detection zone of the detection lug through the housing wall.

12. The transmission system as claimed in claim 9, wherein a pivot joint kinematically links the plunger and the first coupling part so as to allow a relative rotation of the plunger and the first coupling part about the axis X.

13. The transmission system as claimed in claim 12, wherein the connecting ring and the first coupling part each comprise a groove, the two grooves being arranged radially opposite one another, and a retaining ring is arranged inside the two grooves.

14. A power train comprising a motor at least one drive wheel, and a transmission system as claimed in claim 9, the transmission system being configured to transmit a torque between the motor and said at least one drive wheel.

15. The power train of claim 14, wherein the power train is electrified.

16. The power train of claim 14, wherein the motor is electric.

17. An electromagnetic actuating device for a torque transmission system, the electromagnetic actuating device comprising:
- a shell arranged around an axis X, the shell being fixed relative to the axis X and comprising walls defining an annular cavity which houses a coil and at least partially a plunger which is able to move axially along the axis X to actuate a coupling device, the actuating device being characterized in that the shell also comprises a recess and the actuating device comprises a detection lug fixed to the plunger and passing through this recess, wherein the detection lug is able to be detected by a sensor so as to generate a signal representative of the axial position of the plunger, wherein the relative rotation of the plunger relative to the shell along the axis X is prevented or limited by the cooperation of the detection lug and the recess.

18. The electromagnetic actuating device as claimed in claim 17, wherein the plunger is arranged radially outside the coil.

19. The electromagnetic actuating device as claimed in claim 17, wherein the plunger is situated axially facing the coil.

20. The electromagnetic actuating device as claimed in claim 17, wherein the shell comprises, viewed in a plane containing the axis X:
- a first side wall arranged around the axis X,
- a second side wall arranged around the axis X and axially spaced from the first side wall,
- a radially inner wall arranged around the axis X and connecting the first side wall to the second side wall,
- at least one radially outer wall arranged around the axis X and extending axially from the at least one of the first side wall and the second side wall, the plunger being arranged radially inside the radially outer wall and radially outside the radially inner wall.

* * * * *